(12) United States Patent
Turner

(10) Patent No.: US 6,640,927 B1
(45) Date of Patent: Nov. 4, 2003

(54) AUXILIARY SILENCER SYSTEM FOR ALL TERRAIN VEHICLES

(76) Inventor: Willard B. Turner, 7668 Racetrack Rd., Castalia, NC (US) 27816

( * ) Notice: Subject to any disclaimer, the term of this patent is extended or adjusted under 35 U.S.C. 154(b) by 0 days.

(21) Appl. No.: 10/292,958

(22) Filed: Nov. 13, 2002

(51) Int. Cl.[7] .............................. F01N 1/10; F01N 7/08; B60K 13/04; F16L 3/00; F16L 3/08
(52) U.S. Cl. ..................... 181/252; 181/227; 181/228; 180/89.2; 248/58; 248/62; 248/65
(58) Field of Search .................. 181/252, 222, 181/256, 228, 227, 232, 212, 247–249, 255; 180/89.2, 309; 248/58, 62, 65, 207, 229, 226.11, 227.1, 215

(56) References Cited

U.S. PATENT DOCUMENTS

| | | | | | |
|---|---|---|---|---|---|
| 4,068,736 A | * | 1/1978 | Dean et al. | ................. | 181/224 |
| 4,616,732 A | * | 10/1986 | Carboni | ....................... | 181/232 |
| 4,638,965 A | * | 1/1987 | De Bruine et al. | ........... | 248/59 |
| 5,388,408 A | * | 2/1995 | Lawrence | ..................... | 60/324 |
| 5,633,482 A | * | 5/1997 | Erion et al. | .................. | 181/282 |
| 5,673,877 A | * | 10/1997 | Karner et al. | .................. | 248/58 |
| 5,708,238 A | * | 1/1998 | Asao et al. | .................. | 181/272 |
| 5,892,186 A | * | 4/1999 | Flugger | ...................... | 181/252 |
| 6,267,199 B1 | * | 7/2001 | Chang | ......................... | 181/252 |
| 6,405,826 B1 | * | 6/2002 | Bass | ............................ | 181/228 |
| 2002/0036114 A1 | * | 3/2002 | Tobias | ......................... | 181/241 |

* cited by examiner

Primary Examiner—Robert E. Nappi
Assistant Examiner—Patrick Miller
(74) Attorney, Agent, or Firm—Mills Law Firm PLLC

(57) ABSTRACT

An auxiliary silencer system for connection with the exhaust system of an all terrain vehicle includes a fiberglass packed flow through silencer having a rigid elbow connected with the existing tail pipe and positioned by adjustable brackets transversely on the vehicle in alignment with the existing system.

5 Claims, 5 Drawing Sheets

AUXILIARY SILENCER SYSTEM FOR ALL TERRAIN VEHICLES

FIELD OF THE INVENTION

The present invention relates to a silencer device for a vehicle, and, in particular, to an auxiliary silencer system for the exhaust systems of all terrain vehicles.

BACKGROUND OF THE INVENTION

All terrain vehicles ("ATVs") are very popular with sporting enthusiasts. Typically, an all terrain vehicle is provided with a muffler in order to reduce the noise from same, however, such vehicles still produce a significant amount of noise when in operation. Many operating situations are adversely affected by such exhaust noise. For hunting or photography activities, the noise disturbance can cause the wildlife to flee. Livestock operations employing the vehicles are also oftentimes disrupted by the existing noise levels. Further, recreational activities by the vehicles on public lands cause annoyances and complaints.

In view of these shortcomings of existing exhaust systems, various supplemental silencing apparatus has been employed to reduce the noise levels of the ATVs. Generally, these supplemental devices have employed existing muffler units that are connected in various patch work arrangements to the vehicle and the existing exhaust system. Flexible tubing that must be cut to length and adapters have been used to connect the muffler tail pipe with the supplemental muffler. Various clamps and brackets are then used for vehicle mounting. The resultant system is labor intensive to install and unsightly on the vehicle.

Accordingly, it has become desirable to develop a silencer device for an all terrain vehicle that can be readily installed with ordinary tools, provides exhaust noise reduction without compromising vehicle performance, and provides custom integrated appearance on the vehicle, allowing the silencer to be user both as original or after market equipment on all current vehicles.

SUMMARY OF THE INVENTION

The present invention solves the problems associated with noise produced by all terrain vehicles, and other problems, by providing an auxiliary silencer system that is integrated functionally and stylistically on the vehicle. The silencer of the system comprises an outer housing having a perforated center tube extending axially therethrough providing an annular acoustical chamber. The center tube has an inlet coupled with a rigid intake elbow telescopically coupled with the exhaust pipe and an outlet connected with a tail pipe. The center tube includes a central plug that establishes an exhaust flow path from the inlet, through the perforations into the chamber and into the outlet and tail pipe. Fiberglass packing materials loosely fill the chamber for providing increased attenuation of the exhaust flow. Vertical support rods are integrated on the silencer for hanging the silencer on the vehicle using simple adjustable C-clamps to effect secure mounting using simple, available tools. The resultant unit may be readily installed without modification of most current vehicles and provides substantial noise reduction without a sacrifice in vehicle performance. A heat shield rearwardly encloses the silencer and the combination provides additional spark arresting capabilities and thermal protection. In installation represent a custom integrated exhaust system lying stylishly in a common plane with the original system and compactly transverse to the rear of the vehicle.

DESCRIPTION OF THE DRAWINGS

The above and other features and advantages of the present invention will-become apparent upon reading the following detailed description taken in conjunction with the accompanying drawings in which.

DETAILED DESCRIPTION OF THE PREFERRED EMBODIMENT

Figure 1:
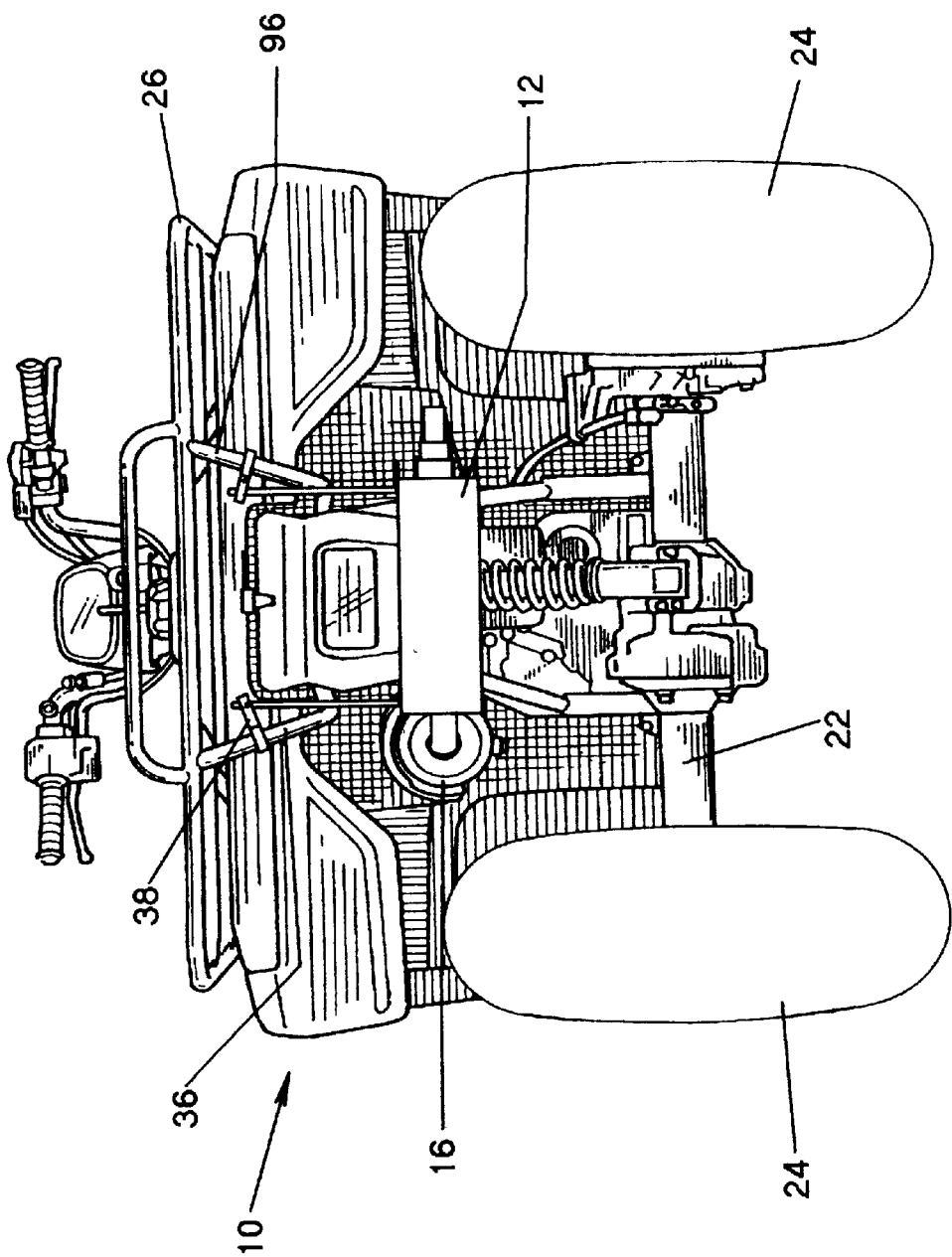
FIG. 1 is an end view of an all terrain vehicle having an auxiliary silencer system for the vehicle exhaust system in accordance with a preferred embodiment of the invention.
Figure 2:
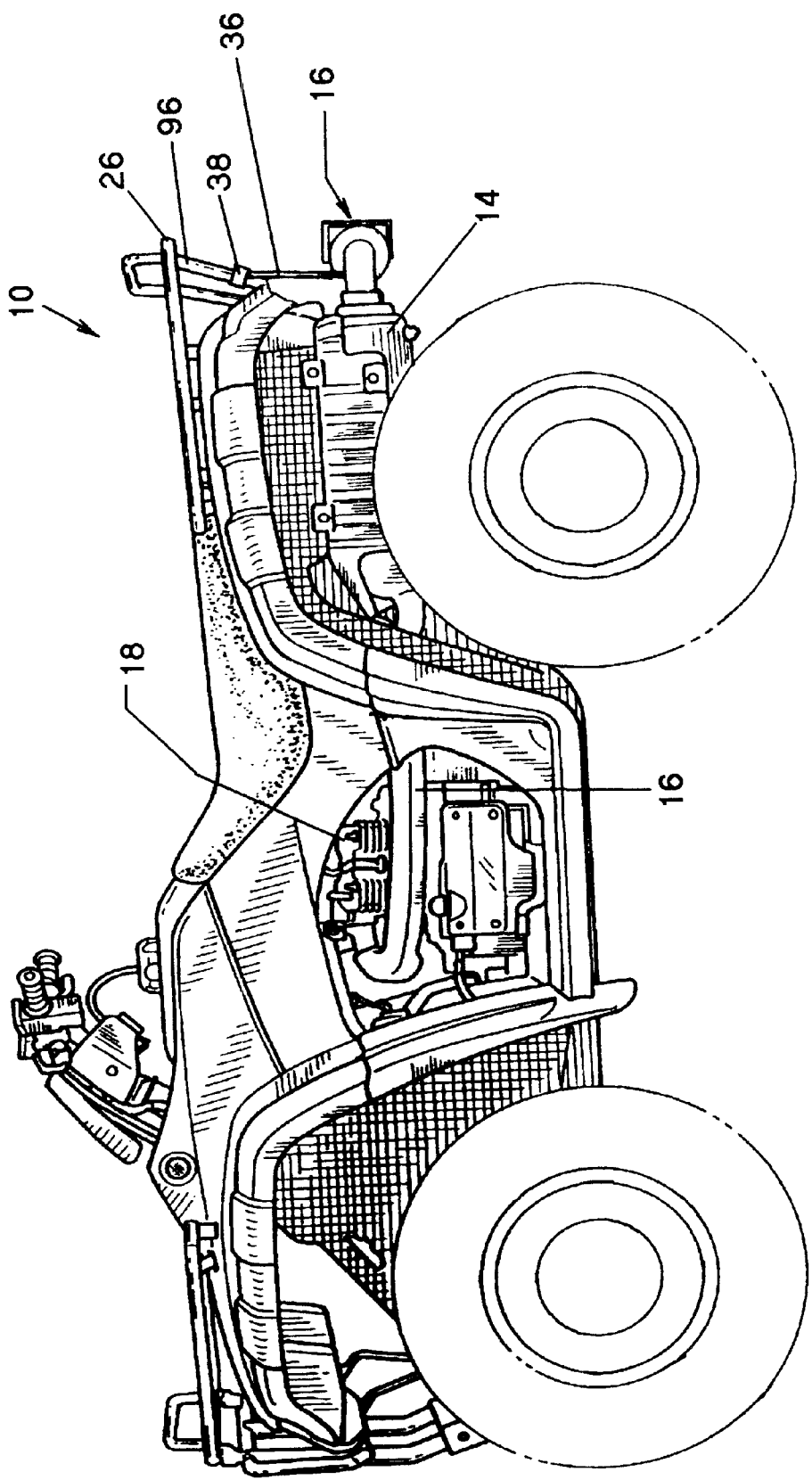
FIG. 2 is a side view of the all terrain vehicle with auxiliary silencer as shown in FIG. 1.
Figure 3:
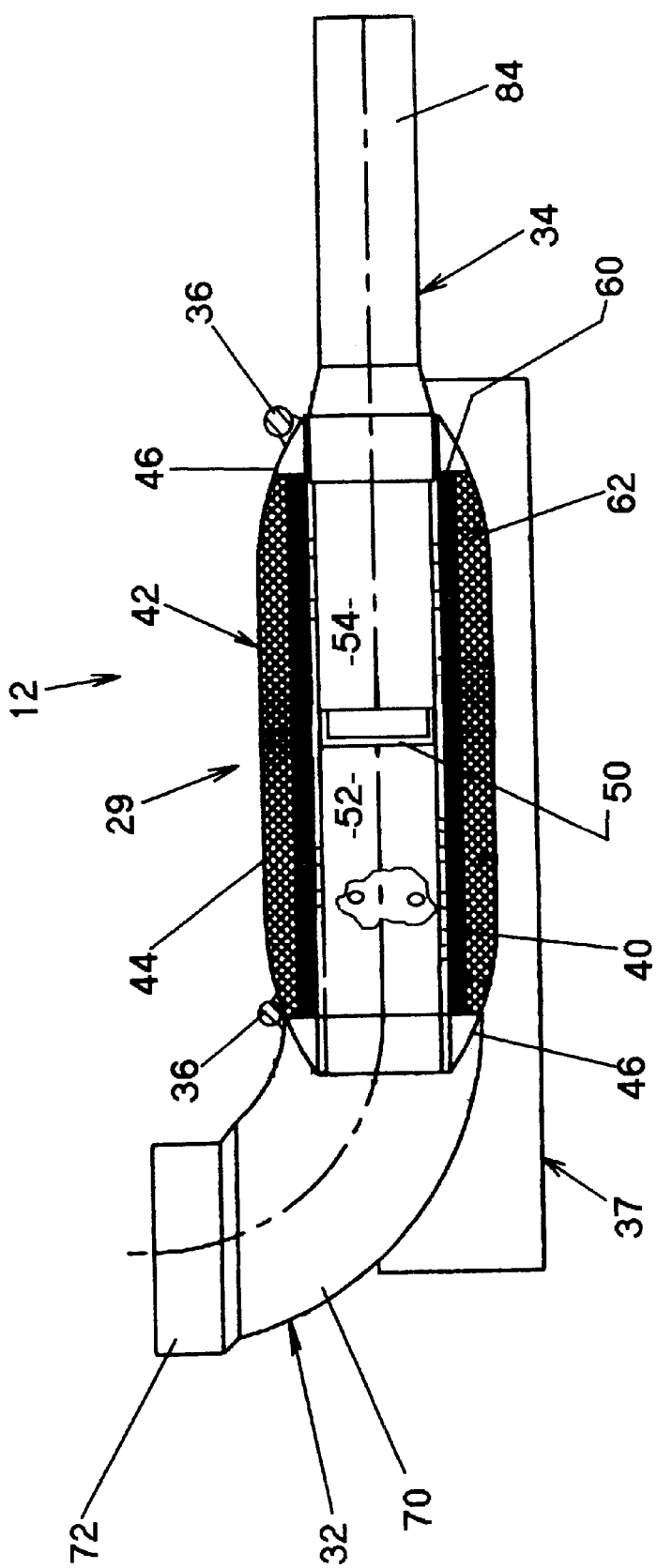
FIG. 3 is a side elevational view of the silencer.
Figure 6:
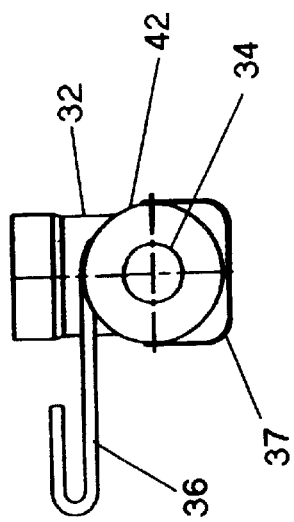
FIG. 6 is a right end view of the silencer.
Figure 4:
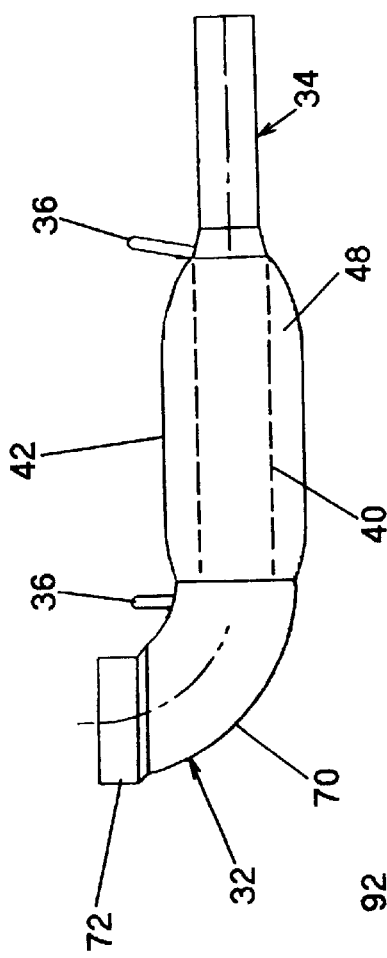
FIG. 4 is a side cross sectional view of the silencer shown in FIG. 3 with the heat shield removed.
Figure 5:
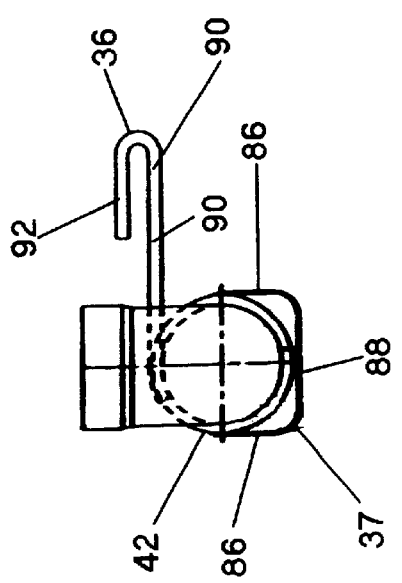
FIG. 5 is a left end view of the silencer.
Figure 7:
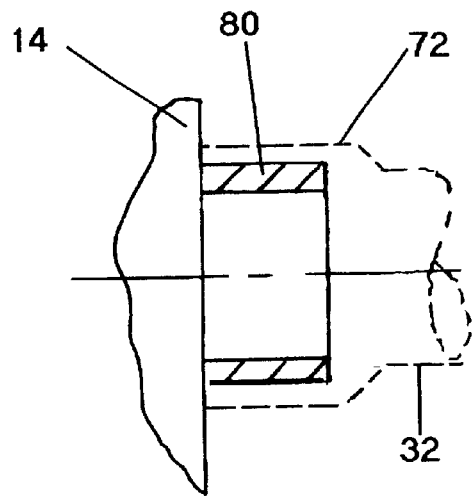
FIG. 7 is a fragmentary cross sectional view illustrating a cylindrical adapter between the muffler of the vehicle and the silencer of the invention.

Referring to the drawings for the purpose of describing the preferred embodiment and not for limiting same, FIGS. 1 and 2 illustrate a conventional all terrain vehicle 10 having a rearwardly transversely disposed auxiliary silencer system 12, according to the invention, connected to the muffler 14 of the existing exhaust system 16 leading from the vehicle engine 18. The muffler 14 is longitudinally aligned along the vehicle 10 above the rear axle 22 and inwardly of the rear wheels 24 thereof. The vehicle 10 includes body components such as a rack 26 disposed rearwardly and above the muffler. Depending on the vehicle utilized, the muffler 14 terminates in a cylindrical tail pipe in a conventional manner. In certain vehicles, the muffler 16 may terminate at a rear port, without a discrete tail pipe. By way of the adapters described below, the silencer 12 may be readily adapted for use as original or aftermarket equipment for substantially the entire range of presently available all terrain vehicles. The resultant combined exhaust system in compactly integrated with the vehicle in visual alignment with the existing component, providing a custom appearance.

Referring additionally to FIGS. 3 through 6, the silencer system 12 comprises a silencer 29 having an acoustical housing 30 having an inlet elbow 32 at one end, an tail pipe 34 at the other end, a pair of hanging support brackets 36, and a heat shield 37. In operative position, the silencer 12 is transversely disposed at the rear of the vehicle 12 in a common plane with the existing exhaust system with the inlet pipe 32 fluidly and acoustically coupled to the muffler 14 and mechanically attached at the upper ends of the brackets 36 to the rack 26 by adjustable mounting clamps 38.

The housing 30 includes a perforated center pipe 40 surrounded by a cylindrical thin wall outer shell 42 including an enlarged cylindrical center section 44 having end caps 46 with axial openings received over the ends of the center pipe 40 and sealed thereto by circumferential welds, thereby establishing an acoustical chamber 48 between the center pipe and the shell 42. A cylindrical plug 50 is positioned in the middle of the center pipe 40 and divides the latter into an inlet tube 52 and an outlet tube 54. The perforations in the tubes 52 and 54 may be circular or alternatively shaped openings, or other apertured configurations such a louvers. Accordingly, an acoustical flow path is serially provided within the housing 40 from the inlet tube 52 to the chamber 48 to the outlet tube 54. The flow area through the perforations is preferably sufficient to handle the exhaust gas flow from the engine without a significant pressure loss or resultant reduction in vehicle performance.

A base filler fiberglass mat 60 is encircles the center pipe 40 overlying the perforations in the tubes 52, 54. An attenuating fiberglass mat 62 is interposed between the sleeve and the mat 60, filling loosely the remaining volume of the chamber 48. The mats 60, 62 function to attenuate the exhaust gas noise resulting in significantly reduced amplitudes with minimal pressure loss. The mat 62 is preferably low density and the mat 60 is preferably a medium density and serves to prevent material migration from the acoustic volume into the exhaust stream.

Figure 8:
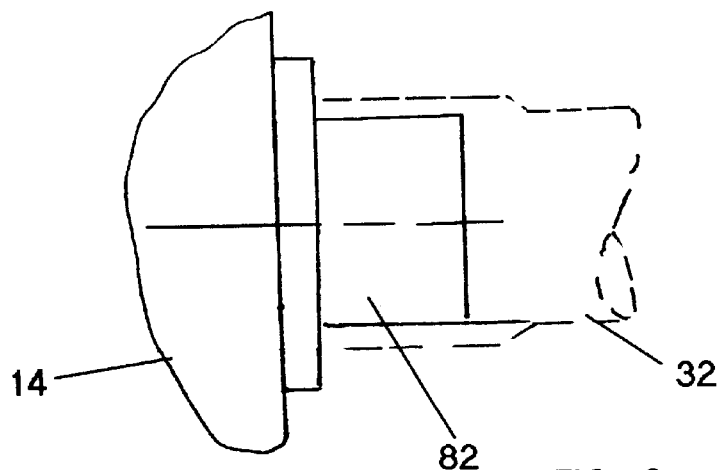
FIG. 8 a fragmentary cross sectional view illustrating an adapter collar between the muffler of the vehicle and the silencer of the invention.
Figure 9:
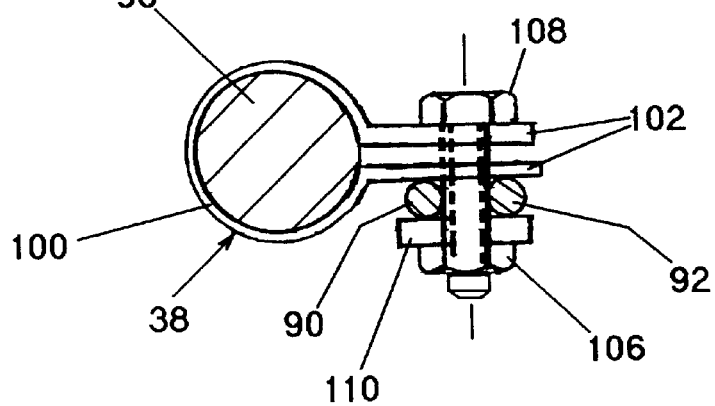
FIG. 9 is a view taken along line 9—9 in FIG. 1 showing the mounting connection between the support bracket of the muffler and the mounting clamp.

The inlet elbow 32 is a cylindrical pipe formed of rigid tubing and curved at a 90° angle to position the silencer transverse to the rear of the vehicle. The elbow 32 includes a cylindrical bend section 70 connected at an inner end to the inlet end cap 46. The inlet elbow 32 has a slightly larger diameter than the center pipe 40 for handling the exhaust flow without appreciable pressure loss. The section 70 terminates at the outer end in an enlarged collar 72 for telescopic connection with the tail pipe of the muffler 16 of the exhaust system 18. Preferably, the collar 72 has a close sliding fit with the tail pipe. In the event of diametral differences between the tail pipe and the collar, as shown in FIG. 8, a cylindrical adapter ring 80 of appropriate size may be attached to the muffler tail pipe by suitable means, such as a tack weld, to accommodate the transition. In other instances arising in commercial vehicles wherein a distinct tailpipe is not provided with the muffler, a suitable collared adapter 82 may be welded to the end wall of the muffler.

The outlet tail pipe 34 is coaxially welded to the end of the center pipe 40. The tail pipe 34 extends coaxially outward terminating with a tail pipe outlet 84 disposed horizontally and transverse to the vehicle. If desired, a curved extension may provided on the tail pipe for vertically directing the exhaust gas flow.

The beat shield 37 is generally U-shaped having generally rectangular vertically spaced plates 86 connected with a rectangular base 88. The front edges of the plates are tack welded to the housing 42 with the base 88 rearwardly spaced therefrom. The heat shield 18 generally transversely overlies the housing 42 and adjacent portions of the pipes 32, 34 to thereby provide an effective thermal barrier against the potential adverse consequences of directly contacting the heated surfaces of the silencer.

The brackets 36 are formed of hot rolled steel rod or wire. The brackets include a main leg 90 and a branch leg 92, shorter in length than the leg 90 and integrally connected therewith at a U-shaped reverse bend section 94. The lower ends of the legs 90 are connected by welds to the silencer at the ends of the housing or adjacent pipe. The length of the leg 80 is sufficient to reach available frame attachment locations on the vehicle such as the tubular support posts 96 of the rack 26. The brackets 36 may be limitedly bent for optimizing their location with respect to the attachment locations.

The foregoing components are preferably formed of aluminized steel materials and provided with a heat and corrosion resistant paint of coloration blending with the vehicle.

The mounting clamps 38 each include an C-shaped section 100 having a mar resistant elastomeric coating and terminating with outwardly extending apertured arms 102 carrying a fastener 104 including a nut 106 threaded to a bolt 108 and a washer 110.

For operational mounting, collar 72 of the intake pipe 72 is telescoped over the tail pipe of the muffler and the brackets 36 positioned adjacent the support posts 96. The clamps 38 are disposed over the support posts 96, the fasteners 104 installed, and the clamps vertically shifted until the shank of the bolt 108 engages the bracket section 94. Thereafter, the fastener is tightened to retain the legs 90, 92 between the adjacent arms 102 and the washer 110, thereby positioning the auxiliary silencer in line with the existing exhaust system in a common horizontal plane, providing a custom integrated appearance on the vehicle.

Testing has demonstrated that the flow through silencer design provides substantial sound reductions, 40 to 60 percent at all throttle settings, without adverse reductions in either performance or speed.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. An auxiliary silencer system for fluid and acoustical connection with an exhaust system of an all terrain vehicle provided with a cylindrical tail pipe section extending longitudinally and rearwardly of the vehicle and tubular members at the rear of the vehicle, said auxiliary silencer system comprising: an acoustical silencer including a central pipe member having a plurality of longitudinally extending apertures therein and surrounded by an exterior shell member defining therewith a sealed annular chamber, said central pipe member having a barrier member therein defining an inlet and an outlet fluidly and acoustically serially communicating with said chamber; a heat resistant fibrous material packing in said chamber effective for acoustically attenuating exhaust gas flow therethrough; an inlet member having an outlet coupled with said inlet of said center pipe member and having an enlarged inlet positioned transverse to said center pipe member for telescopic coupling with said tail pipe section of said vehicle; a pair of spaced cylindrical rods having reversely bent upper ends fixedly connected at lower ends to said silencer system and said upper ends located adjacent the rear of the vehicle; and connector means for releasably attaching said upper ends of said cylindrical rods to the rear of the vehicle with said silencer system aligned with the exhaust system of the vehicle, said connector means including clamp sections carried by the tubular members for adjustable positioning therealong and fasteners for fixedly connecting said clamp sections to said tubular members and releasably clamping said upper ends of said cylindrical rods to said tubular members thereby fixedly positioning said silencer system in a common horizontal plane with the exhaust system transverse to the rear of the vehicle.

2. The auxiliary silencer system as recited in claim 1 wherein said fibrous material comprises fiberglass matting.

3. The auxiliary silencer system as recited in claim 2 wherein fiberglass matting including a first fiberglass mat surrounding said central pipe member, and a second fiberglass mat surrounding said first fiberglass mat and having a lesser density.

4. The auxiliary silencer system as recited in claim 1 wherein said apertures are circular perforations.

5. The auxiliary silencer system as recited in claim 1 including a heat shield member attached to and surrounding the top, bottom and rear surfaces of said shell member.

* * * * *